Nov. 10, 1959　　　T. B. GIBBS ET AL　　　2,911,915
TIME FUSE
Filed Sept. 24, 1954　　　　　　　　　　10 Sheets-Sheet 1
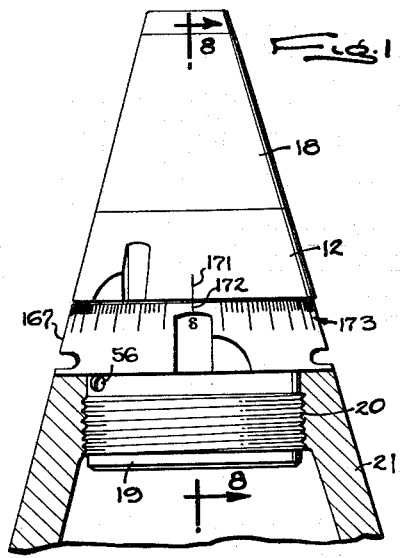
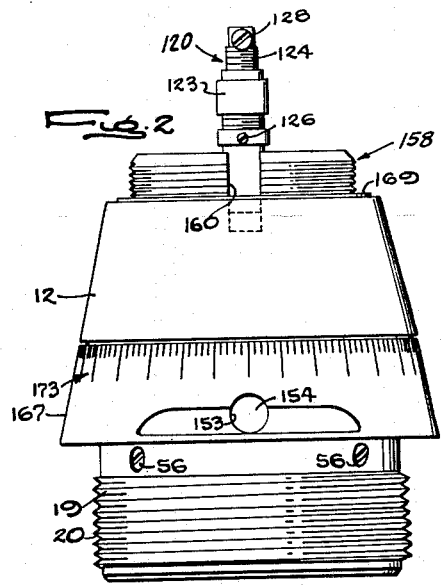
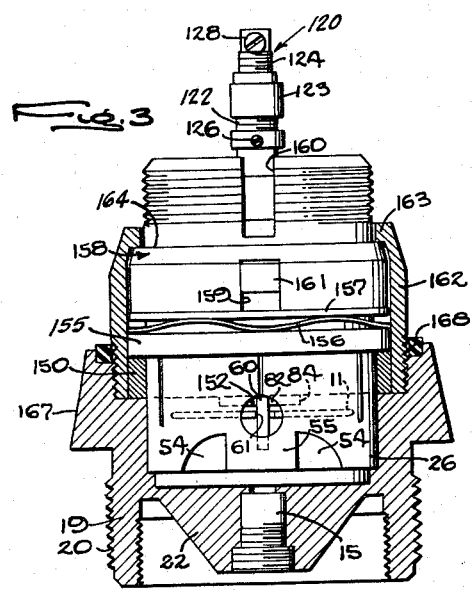
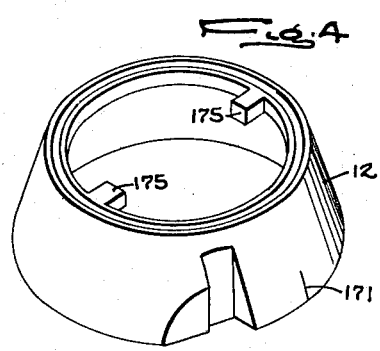
INVENTOR
Thomas B. Gibbs
Jean Fink
By Carlson, Pitzner, Hubbard & Wolfe
ATTORNEY Nov. 10, 1959 T. B. GIBBS ET AL 2,911,915
TIME FUSE
Filed Sept. 24, 1954 10 Sheets-Sheet 2

INVENTOR
Thomas B. Gibbs
Jean Fink
By Carlson, Pitzner, Hubbard & Wolf
ATTORNEY

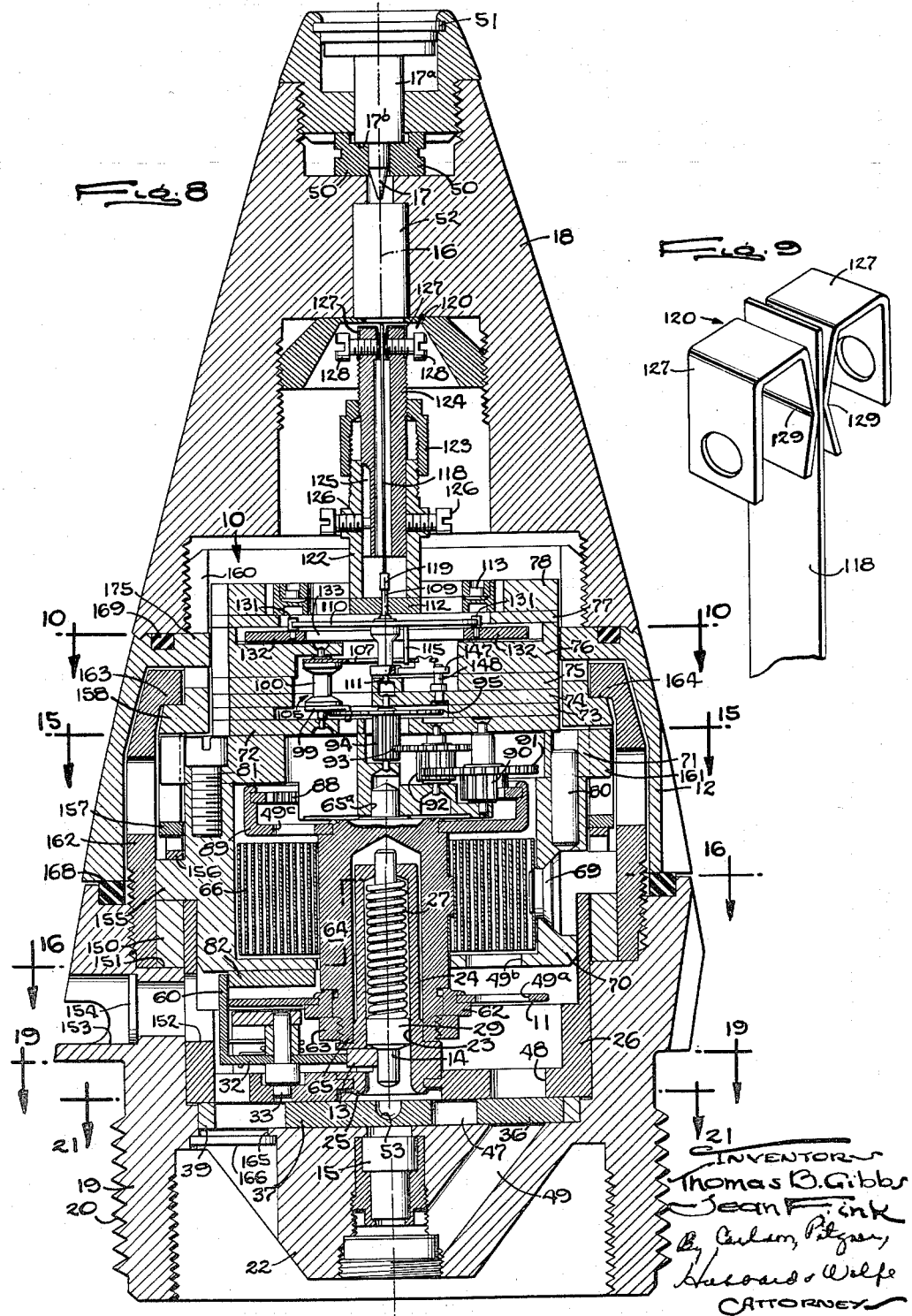

Nov. 10, 1959    T. B. GIBBS ET AL    2,911,915
TIME FUSE
Filed Sept. 24, 1954    10 Sheets-Sheet 4
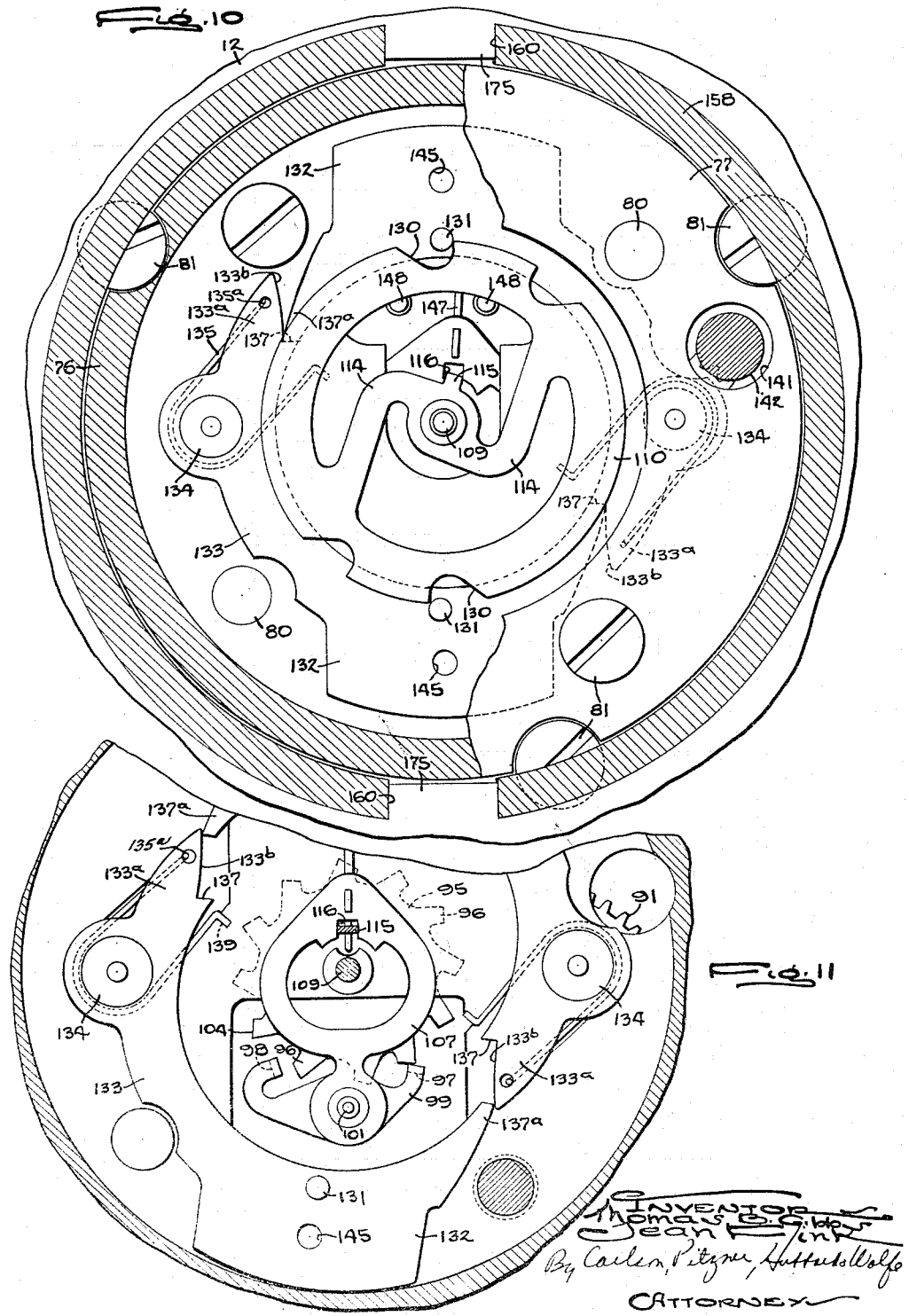

Nov. 10, 1959     T. B. GIBBS ET AL     2,911,915
TIME FUSE
Filed Sept. 24, 1954     10 Sheets-Sheet 5

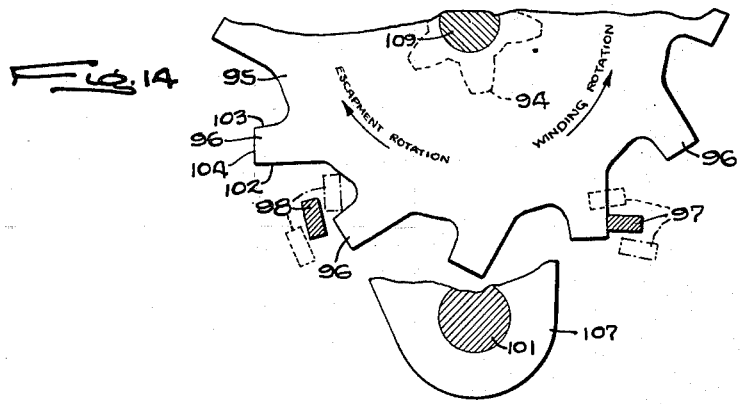
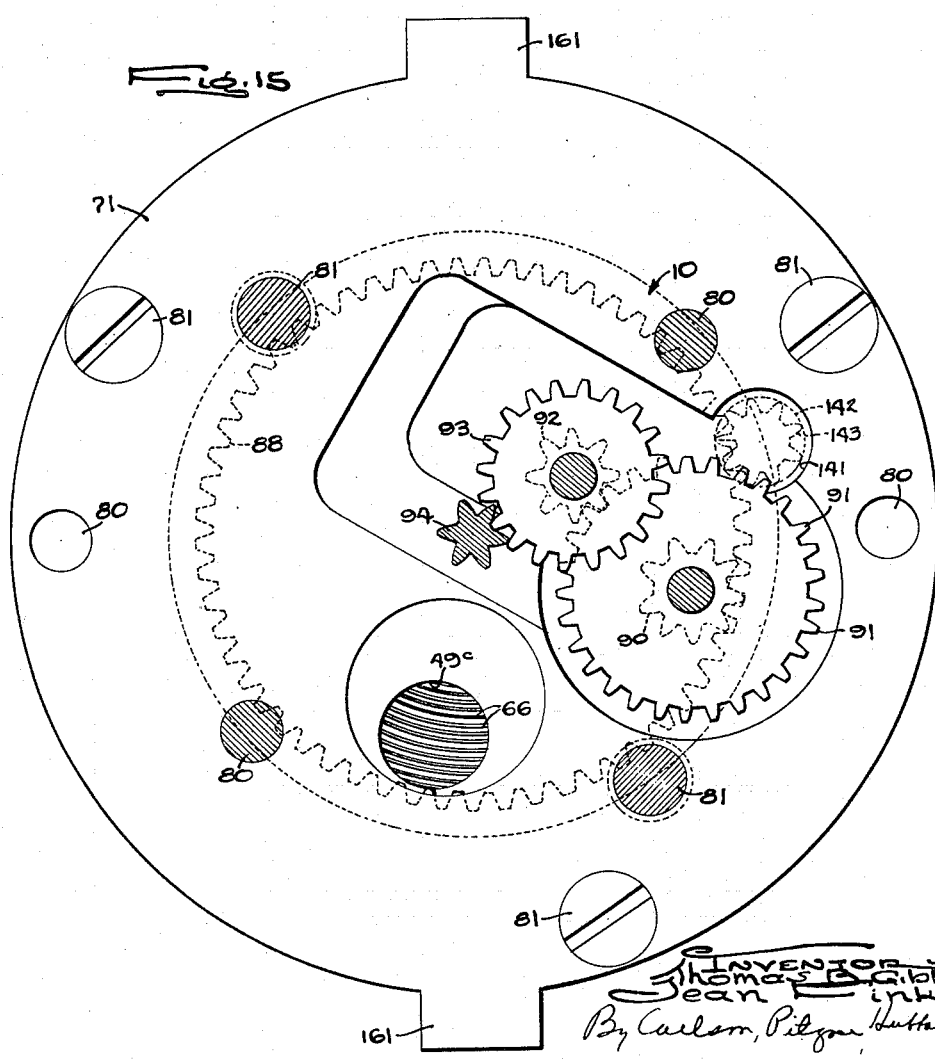

Nov. 10, 1959  T. B. GIBBS ET AL  2,911,915
TIME FUSE

Filed Sept. 24, 1954  10 Sheets-Sheet 7

INVENTOR
Thomas B. Gibbs
Jean Fink
By Carlson, Pitzner, Hubbard & Wolfe
ATTORNEY

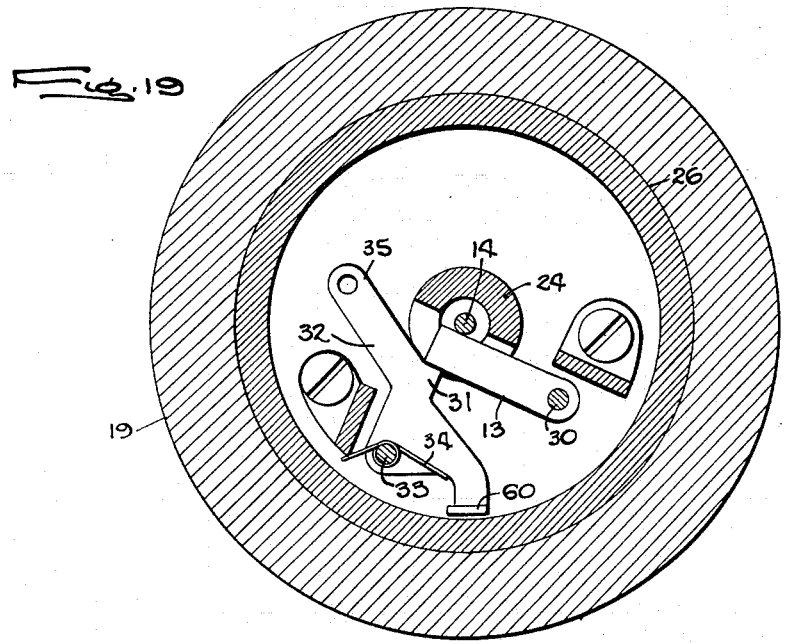
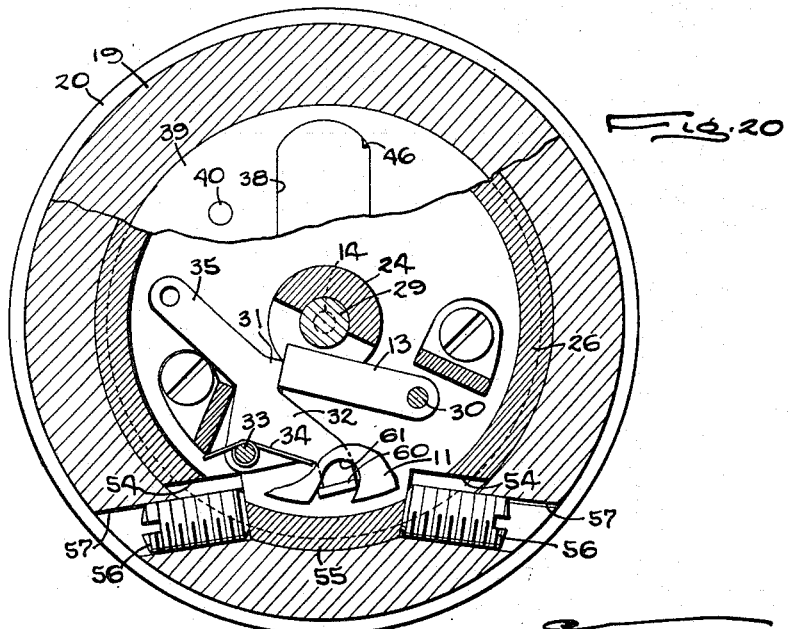

Nov. 10, 1959 T. B. GIBBS ET AL 2,911,915
TIME FUSE
Filed Sept. 24, 1954 10 Sheets—Sheet 9
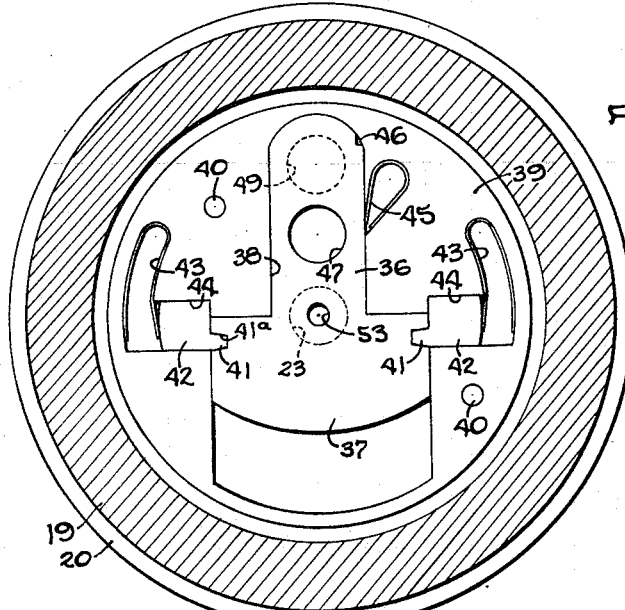
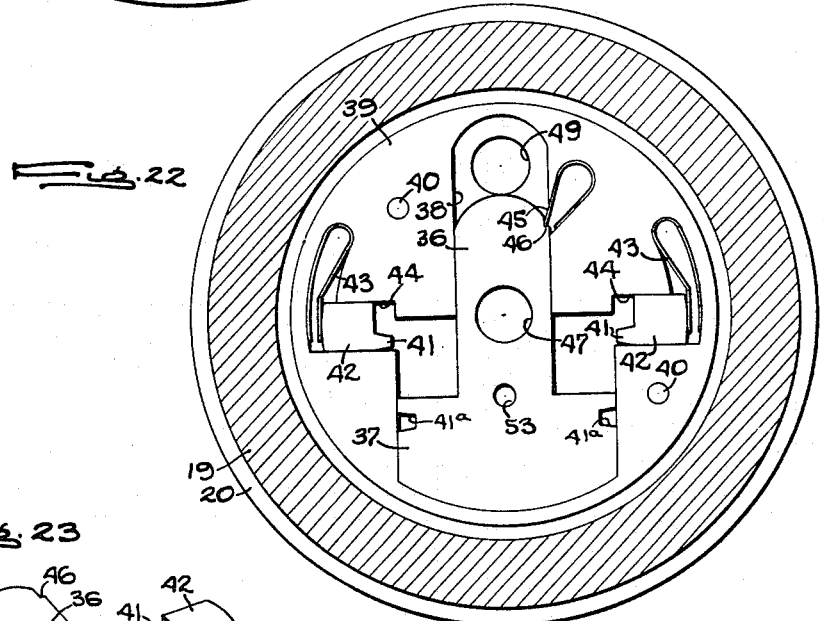
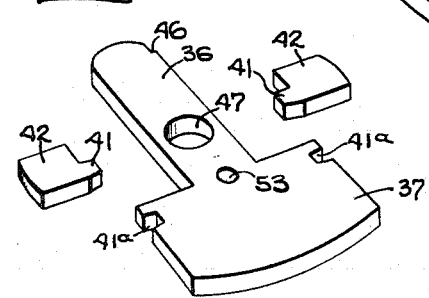

Nov. 10, 1959  T. B. GIBBS ET AL  2,911,915
TIME FUSE
Filed Sept. 24, 1954  10 Sheets-Sheet 10
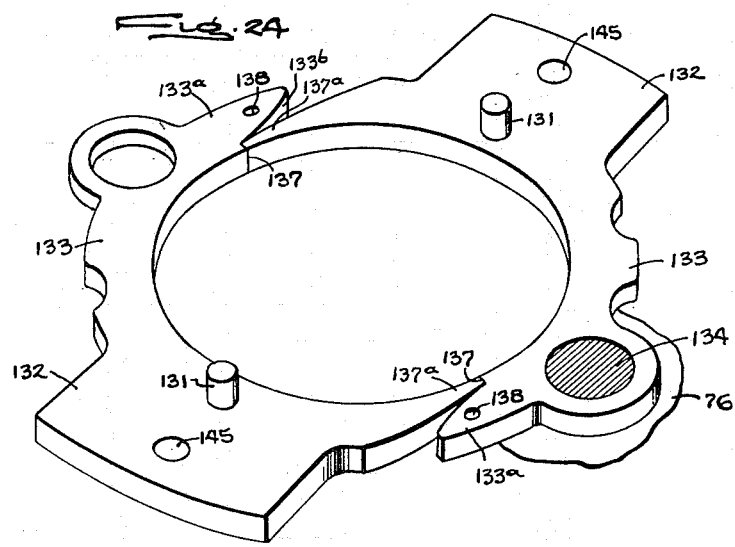
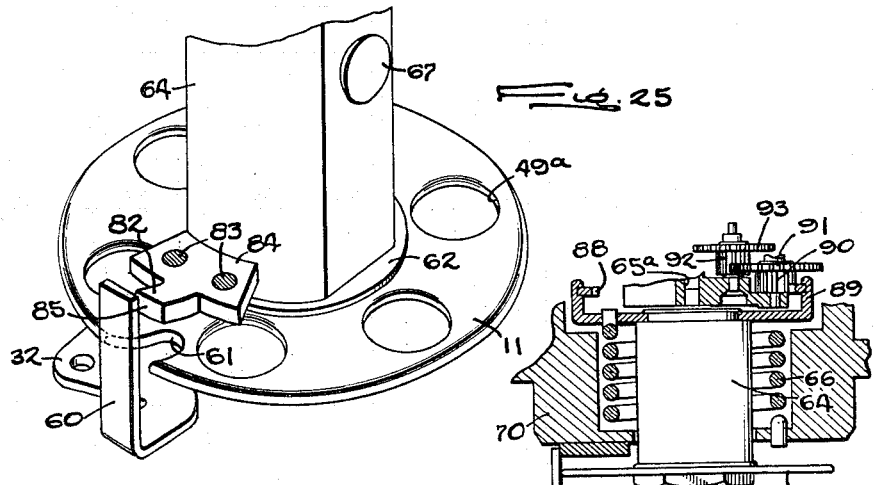
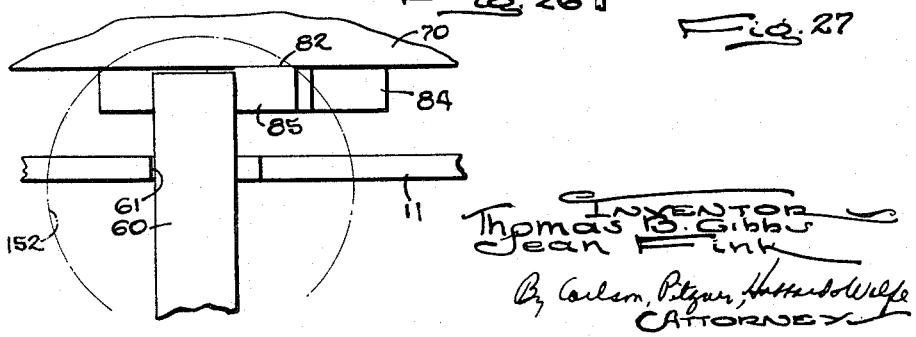
INVENTOR
Thomas B. Gibbs
Jean Fink
By Carlson, Pitzner, Hubbard & Wolfe
ATTORNEYS United States Patent Office 2,911,915
Patented Nov. 10, 1959

2,911,915

TIME FUSE

Thomas B. Gibbs and Jean Fink, Janesville, Wis., assignors to Gibbs Manufacturing and Research Corporation, Janesville, Wis., a corporation of Wisconsin Application September 24, 1954, Serial No. 458,056

16 Claims. (Cl. 102—71)

This invention relates to a combined time and impact fuse particularly adapted for use in projectiles and including a clock work type of timer activated in response to rotation of the projectile and operable after the lapse of an interval predetermined by the fuse setting to release the firing pin which prior to firing of the projectile is blocked by a centrifugally responsive safety device.

The general object is to provide a fuse of the above character which, as compared to fuses heretofore devised, measures the timing interval with much greater accuracy, which is more reliable and consistent in operation, which is considerably simpler in construction, which lends itself to production by high speed precision manufacturing methods, which is easier to assemble and adjust for the zero setting, which is safer to handle during assembly and transportation, and which is more water-proof.

A second object is to provide a fuse whose timing action is not affected by turning of the timer mounting at high speed as during the flight of a projectile.

A third object is to employ as the fuse timer a spring driven clockwork whose regulation may be tested without the necessity of rotating the fuse.

A fourth object is to construct and arrange the movable parts of the clockwork and firing mechanisms of the fuse with their centers of mass disposed substantially on the axis of the projectile in which the fuse is used.

A fifth object is to provide safety devices of new and improved construction for positively preventing any possibility of accidentally starting the timer or releasing the firing pin during transportation or handling of the projectile before firing thereof.

A sixth object is to provide a novel construction of the clockwork which enables the main spring to be wound up by reverse turning of the balance wheel while engaging the pallet lever.

A seventh object is to provide a fuse whose zero setting may be made precisely and after complete assembly of the fuse.

An eighth object is to positively block the movement of the firing pin to firing position in the event that the pin is released prematurely.

The invention also resides in the novel construction of the safety devices both in the clockwork and for the firing pin, in the manner of operating the timer to avoid the affects of friction or backlash, and in the manner of interlocking the parts to facilitate precision assembly.

Other objects and advantages of the invention will become apparent from the following detailed description taken in connection with the accompanying drawings, in which Figure 1 is a fragmentary elevational view partially in longitudinal section of a fuse mechanism embodying the novel features of the present invention.

Fig. 2 is an enlarged view of the fuse mechanism with the nosepiece removed.

Fig. 3 is a view similar to Fig. 2 with the fuse body and clamp shown in section.

Fig. 4 is a perspective view of the adjusting ring.

Fig. 8 is a longitudinal sectional view of the fuse mechanism taken on the line 8—8 of Fig. 1.

Fig. 9 is a fragmentary view of the hair spring and its clamp.

Fig. 10 is a fragmentary section taken along the line 10—10 of Fig. 8.

Fig. 11 is a fragmentary view of a part of Fig. 10 showing another position of the parts.

Fig. 14 is a schematic view of the escapement and parts of the pallet.

Figure 16:
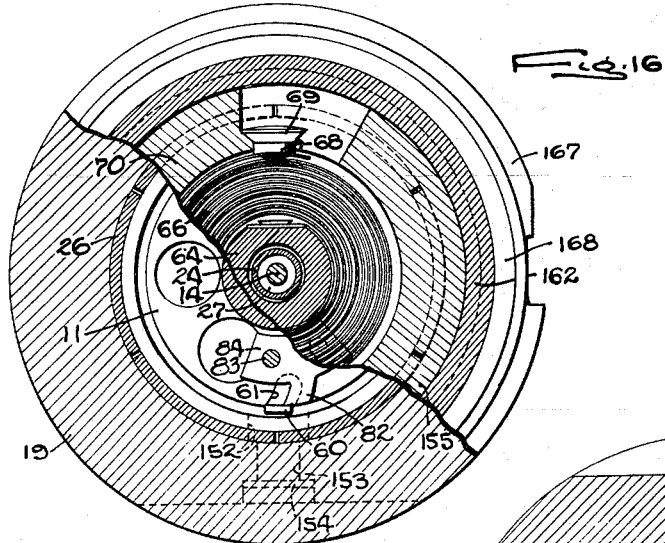

Figs. 15 and 16 are fragmentary sectional views taken respectively along the lines 15—15 and 16—16 of Fig. 8.

Figure 17:
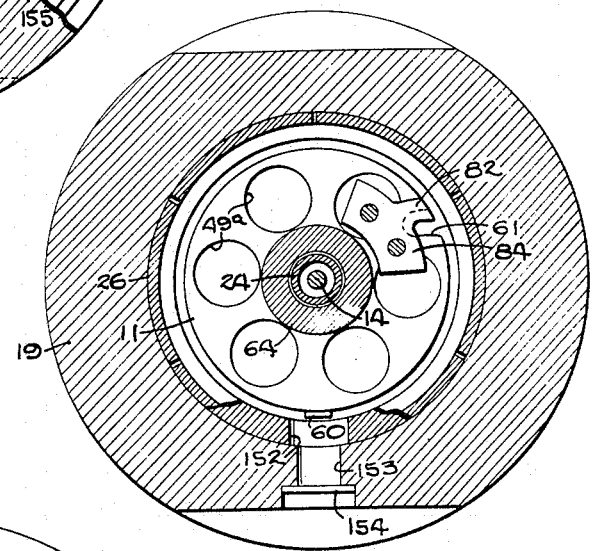
Figure 18:
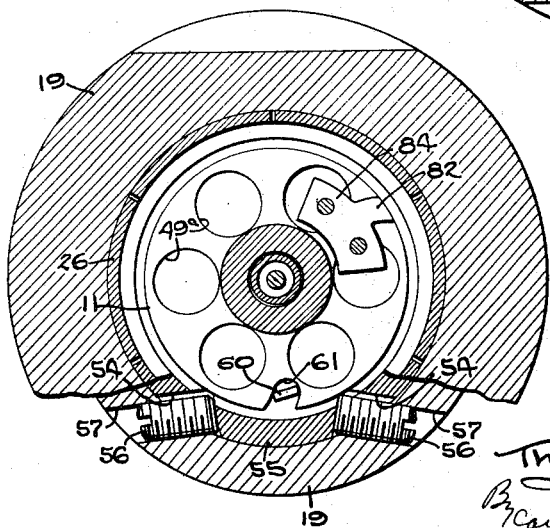

Figs. 17 and 18 are views similar to Fig. 16 but showing different positions of the firing pin release mechanism.

Fig. 19 is a fragmentary section taken along the line 19—19 of Fig. 8.

Fig. 20 is a similar view showing a different position of the firing pin release mechanism.

Fig. 21 is a section taken along the line 21—21 of Fig. 8.

Fig. 22 is a view similar to Fig. 21 showing a different position of the firing pin safety mechanism.

Fig. 23 is a perspective view of the flyweights of the firing pin safety mechanism.

Fig. 24 is a perspective view of the flyweights of the clockwork safety mechanism.

Fig. 25 is a fragmentary perspective view of the firing pin release mechanism.

Fig. 26 is a fragmentary elevational view of the parts shown in Fig. 25.

Fig. 27 is a fragmentary sectional view similar to Fig. 8 showing a modified clockwork arrangement.

*Fuse in general*

Figure 6:
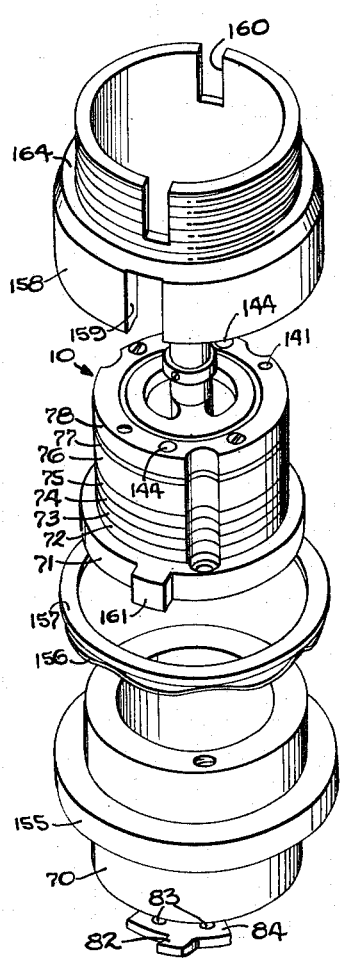
Fig. 6 is an exploded perspective view of the assembled clockwork and the associated mounting parts.
Figure 7:
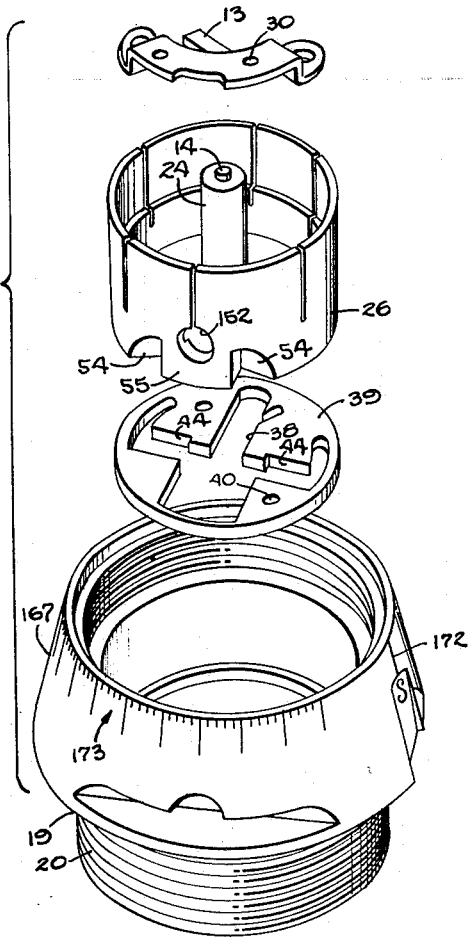
Fig. 7 is an exploded perspective of the fuse body and the firing pin safety mechanism.

In the drawings, the invention is incorporated in a time fuse for projectiles having a normally inactive clockwork 10 (Fig. 8) which is started in response to actual firing of the projectile and operates to turn a timing element or disk 11 which, after an interval determined by preliminary adjustment of a setting ring 12, releases the latch 13 of the firing pin 14 by which a percussion cap 15 is activated to explode the main charge of the projectile. The clockwork and the firing pin with its release mechanism form separate unitary subassemblies (see Figs. 6, 7 and 8) spaced along the projectile axis 16 between the cap 15 and the striker 17 of the impact firing mechanism.

The operating parts above referred to are all housed within a three part hollow casing whose intermediate portion is formed by the adjusting ring 12 and whose opposite ends are formed by a tapered upper cap 18 and a hollow body or base 19 threaded at 20 to screw into the end of the main casing 21 (Fig. 1) of the projectile. The body 19 includes a central depending boss 22 in which the percussion cap 15 is suitably clamped (Fig. 8) with its end exposed along the projectile axis.

*Firing pin and its release*

The firing pin 14 extends along the axis 16 and is guided at 23 within a tube 24 staked at 25 into the bottom of a cup 26 (Figs. 7 and 8) seated within the base 19 and forming a support mounting the latch 13 for independent adjustment about the fuse axis. A compression spring 27 acts between the tube end and a head 29 on the pin 14 to urge the latter toward the cap 15. During storage and transportation and until the projectile has been fired from a rifle, the firing pin is held in the retracted position shown in Fig. 8 by the latch 13 which underlies the beveled end of the pin head 29 and comprises a lever (Fig. 19) fulcrumed at 30 on the bottom of the latch support or cup 26 with its free end swingable through a slot in the side of the guide tube 24. The latch is normally blocked and held in active position (Figs. 19 and 20) beneath the firing pin shoulder by a lug 31 on a bell crank type of detent lever 32 fast on a pin 33 which is pivoted on the cup 26 to swing about an axis paralleling the firing pin, the lever being urged by a torsion spring 34 in the latch releasing direction. Withdrawal of the detent lug outwardly beyond the end of the latch is assisted by centrifugal force when the projectile is freed, this force being produced by the mass of a weighted extension 35 of the lever.

When the detent lever is retracted to the position shown in Fig. 20 and the projectile is spinning at a high speed as during firing from a rifle, the centrifugal force acting on the free end of the latch 13 swings the latter outwardly from beneath the head 29 thus allowing the firing pin to be projected toward the percussion cap 15 under the action of the spring.

Safety control of firing pin

Novel means is provided for preventing effective contact between the firing pin and the percussion cap under any condition which may occur during manufacture, transportation or handling and until the projectile is in actual flight. For this purpose, the lower end of the firing pin is normally blocked by a slider 36 (Figs. 8 and 21) which is guided in a groove 38 extending diametrically across the bottom of the body 19, and, in this instance, stamped out of a plate 39 (Fig. 7) pinned at 40 (Figs. 7 and 22) to the top of the boss 22 on the fuse body. Movement of the slider to unblocking position (Fig. 22) to permit projection of the firing pin against the percussion cap 15 is preferably produced by centrifugal force resulting from spinning of the projectile. To this end, one end of the slider is formed with an enlargement 37 which constitutes a flyweight for urging the slider to the position shown in Fig. 22 when the projectile, as fired from a rifle, attains a predetermined speed.

Normally, the slider is held releasably in blocking position by two latches which are released by centrifugal forces exerted in opposite directions and along a diameter which is angularly spaced and preferably at right angles to the slider guideway. Herein, the latches take the form of flyweights 42 disposed on opposite sides of the projectile axis and slidable in diametrical grooves 44 (Figs. 7 and 21) stamped out of the plate 39 at right angles to the guideway 38.

Normally (see Figs. 21 and 22) notches 41a in opposite sides of the slider 36 receive lugs 41 on the flyweights 42 which are urged inwardly by bent leaf springs 43. The flyweights thus latch the slider in the position shown in Fig. 21 in which a solid part of the slider is disposed opposite the lower end of the firing pin 14.

Because of the two weights and their disposal on diametrical sides of the projectile axis, the slider remains latched effectually in the blocking position (Fig. 21) until both of the weights are simultaneously subjected to outwardly directed forces. Such simultaneous action can ordinarily take place only as a result of actual firing of the projectile and the attainment of a high rotational speed capable of developing sufficient centrifugal force to overcome the weights 42 and their springs. The provision for actuating the slider centrifugally constitutes a further safety in that a third and outwardly directed force in a direction perpendicular to the release of the latch weights 42 is required in order to unblock the firing pin. Obviously there is no possibility of such three differently directed forces being applied to the projectile except by actual spinning of the projectile during firing from a rifle.

When, as a result of spinning of the projectile in actual flight, the weights 42 are thrown outwardly under centrifugal force, the slider 36 will, due to centrifugal action on its enlarged end 37, be shifted endwise to the position shown in Fig. 22 where it becomes latched by the entry of a spring finger 45 in behind a shoulder 46 on the slide. In this position, a hole 47 in the slide is brought into axial alinement with the firing pin so as to permit the latter, when its latch 13 is released, to be projected against the cap 15 to explode the main charge of the projectile.

Impact explosion of the projectile

The slider 36 also is utilized as a safety for the impact firing of the projectile charge. This is accomplished by using the slider 36 as a valve to cover a passage 49 in the body 19 when the slider is retracted (Figs. 8 and 21) but, when the slide is released and moved to the position shown in Fig. 22 to open this passage and establish communication between the interior of the fuse mechanism and the upper cap 18 which carries mechanism for causing the main projectile charge to be ignited in response to a direct hit detected by inward depression of the usual closure 51 (Fig. 8). For this purpose, the end of the side 36 opposite the weight 37 is positioned to uncover the passage 49 and a hole 48 in the bottom of the cup 26 when the slide has, by spinning of the projectile, moved to firing position (Fig. 22). In all other positions the slide blocks the holes 48 and 49 (Fig. 21).

The pressure for causing explosion of the projectile by impact with the target results from activation of a detonator 52 following firing of the projectile. The resulting spinning of the projectile causes weights 50 to be thrown outwardly thus unblocking the plunger 17a of the striker and permitting the latter to move when the flying projectile strikes a target or other object. The weights are slidable radially and, until thrown outwardly centrifugally, underlie shoulders 17b on the striker. The pressure resulting from explosion of the detonator 52 is transmitted through communicating passages around and through the clockwork to the space within the cup, these passages including holes 49a—49c (Fig. 8).

If the striker 17 of the loaded projectile is released unintentionally and the detonator 52 thereby activated before actual firing of the projectile from a rifle, the slider 36 remains in set or blocking position and, since the passage 49 is covered, transmission of the pressure to fire the cap 15 is prevented. Explosion of the main projectile charge except during actual flight of the projectile is thus avoided.

Safety control in the event of premature firing pin release

If, for any reason whatsoever, the latch 13 is released prematurely and accidentally without actual firing of the projectile from a rifle, the firing pin is locked positively against subsequent effective contact with the cap 15 so that the main charge cannot be ignited. To this end, a cylindrical recess 53 (Figs. 8 and 21) formed in the slider 36 is disposed in axial alinement with the lower end of the firing pin 14 so as to receive this end if the pin is ever released with the slider in blocking position (Fig. 21). In this position, the firing pin positively locks the slider against movement even during firing of the projectile from a rifle, and the accompanying release of the slider latches 41 by centrifugal force. Explosion of the main projectile charge independently of the clockwork is thus prevented and the safe deactivation of a fired but unexploded projectile is facilitated.

Zero setting of fuse

It will be observed that the cup 26, the firing pin, the latch and its detent and the safety mechanism formed by the slider 36 form a self contained unit which may be assembled separately and fitted readily into the body 19 of the fuse. As will be described in detail later, the zero setting of the fuse is effected by angular adjustment of the firing pin subassembly about the projectile axis and relative to the body 19 after complete assembly of the fuse and by observation and adjustment of parts accessible from the exterior of the assembly. To this end, the bottom of the cup 26 is recessed at 54 (Figs. 7, 18, and 20) to form an intervening lug 55 which, when the cup is in the proper angular position and lowered into the body 19, enters between the opposed inner ends of two screws 56 threading through holes 57 which extend tangentially of the base 19 and are exposed at their outer ends in the threaded lower end of the body so that the screws are accessible after assembly of the fuse but before attachment of the latter to the projectile casing. It will be apparent that by backing off one of the screws and tightening the other, the cup 26 and the firing pin assembly thereon may be turned within the base so that the initial angular position of the release detent 32 may be established with great precision.

Timing disk and its mounting

Actual release of the firing pin latch 13 is controlled by the coaction of a lug 60 (Figs. 8, 16 to 20, 25, and 26) upstanding from the outer end of the release detent 32 and a similarly sized notch 61 opening outwardly from the generally circular outer periphery of a timing disk 11 and brought into registry with the lug when the time interval selected by adjustment of the setting ring 12 has expired. The disk is concentric with the projectile axis and its hub 62 is pressed onto and clamped by a nut 63 against a shoulder on the lower end of a hollow shaft 64 (Fig. 8) which telescopes down over the firing pin guide tube 24 and is journaled on a bearing 65 formed on the tube and an upper bearing 65a on the clock case.

Normally, that is, during transportation of the projectile and until the fuse has been set preparatory to firing, the shaft and the notch 61 in the timing disk 11 are in the zero position shown in Figs. 16, 25, and 26 and in radial register with the lug 60. To provide a suitable safety, the lug 60 is at this time blocked against entry into the notch by a guard or blocking element 82 in the form of a lug spaced above the disk and projecting from a segment 84 secured as by rivets 83 to the bottom of the cup 70. The radius of the outer arcuate end 85 of the guard is equal to that of the periphery of the disk and in the zero position of the latter is alined vertically with the notch 61 and thus blocks the entry of the lug 60. As will appear later, adjustment of the setting ring 12 to select the desired fuse time, turns the entire clockwork unit including the disk 11 and the guard in unison away from the lug 60 (see Fig. 17) while the subsequent operation of the clockwork turns the disk alone relative to the clock case and back toward the lug. When the time interval has expired and the notch is again brought into precise radial alinement with the lug, the latter moves into the notch as shown in Figs. 18 and 20 to retract the detent 32 and thus release the firing pin latch 13.

Clockwork

The shaft 64 constitutes the driven element of the clockwork 10 which may be actuated by energy derived centrifugally from spinning of the projectile in actual flight but which, in the form here selected for illustration, is driven by a spring 66 encircling the projectile axis 16 and having one of its ends anchored on the shaft. The spring shown in Fig. 8 is a generally flat strip of resilient steel secured at its inner end to a lug 67 (Figs. 8 and 25) on the flattened side of the shaft projecting through a hole in the spring end. A hole in the other spring end is riveted at 68 to a pin 69 projecting inwardly from the side of the cup-shaped bottom member 70 of the clock case.

To reduce the friction exerted on the spring 66 during turning of the projectile at extremely high speeds, a helically coiled spring as shown in Fig. 27 may be employed. The wire forming this spring may be of circular cross section and wound to a diameter somewhat larger than the shaft 64 when the spring is unwound. The helix is, of course, contracted as shown, when the spring is wound up by reverse turning of the shaft 64.

The clock case is formed by a series of plate-like stampings 71 to 78 (Figs. 6 and 8) stacked one above the other and held in assembled relation by lower and upper dowels 80 and screws 81. The force of the spring 66 is applied through speed increasing gearing to apply a reduced torque to the toothed wheel 95 of an escapement mechanism 87 (Figs. 8 and 12 to 15). The gearing includes an internally toothed ring gear 88 on a cup 89 staked onto the upper end of the shaft 64. This gear meshes with a pinion 90 whose staff is journaled in the plates 71 and 72 and carries a gear 91 meshing with a pinion 92 whose associated gear 93 drives a pinion 94 rigid with the escapement wheel 95 on a shaft journaled in the plates 71 and 74 and disposed on the projectile axis 16.

Escapement mechanism

Figure 12:
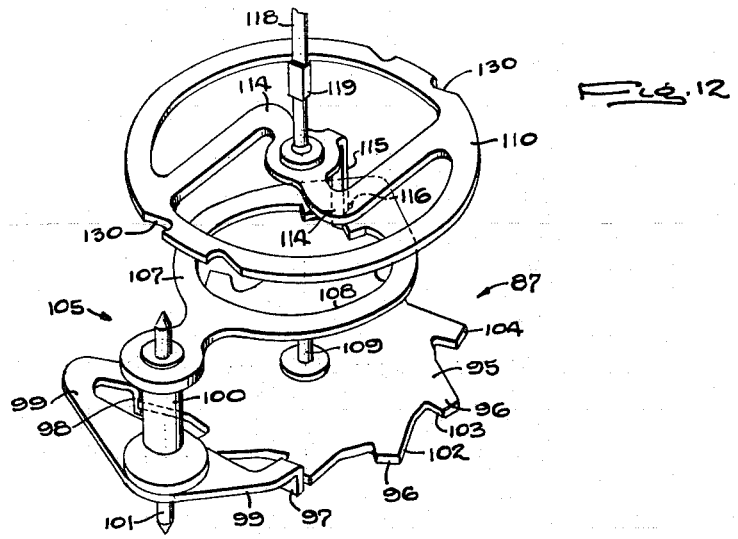
Fig. 12 is a fragmentary perspective view of the clockwork escapement, pallet, and balance wheel.
Figure 13:
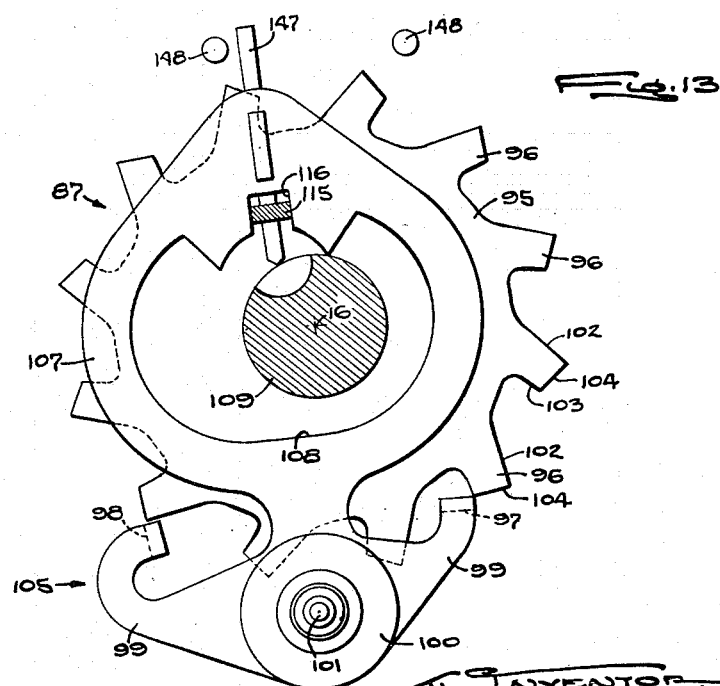
Fig. 13 is a fragmentary plan view of the pallet and escapement wheel.

Spaced teeth 96 on the wheel 95 coact with down turned lugs 97 and 98 on a pallet 105 which is specially constructed in two parts overlying each other with their combined masses distributed substantially uniformly around the axis 16. For this purpose, the lugs are on the free ends of arms 99 which project in opposite directions from one end of a spool 100 fast on a staff 101 whose pointed ends are journaled in the plates 72 and 76 at points offset laterally from the projectile axis. As best shown in Figs. 12 to 14, the escapement teeth 96 are inclined at a small angle away from radii of the wheel and have a trailing or one drop off side 102, an active or leading side 103 disposed at the usual locking angle, and an impulse face 104 at the tooth end. The lugs 97 and 98 coact alternately with the locking sides 103 of the teeth 96 and, as the arms 99 oscillate back and forth through the various positions shown in Fig. 14, the escapement wheel will be permitted to advance clockwise and step by step under the torque of the clock spring 66.

The second part of the pallet comprises an arm 107 fast at one end to the upper end of the spool 100 and formed at its other end with an aperture 108 so as to straddle a shaft 109 on which is fast the hub of a balance wheel 110 centered on the projectile axis. At its lower end, the shaft is journaled at 111 in the plate 75 while the other end is journaled in a block 112 accurately doweled at 113 into a seat at the center of the upper casing plate 78. The balance wheel is a generally flat ring (see Fig. 12) joined to the hub by two spokes which are bent as indicated at 114 to compensate for the small eccentric mass of a lug 115 bent downwardly from the hub into a fork having a notch 116 opening radially and inwardly from the free end of the loop 108 and on the side of the axis 16 remote from the pallet shaft 101.

Hairspring mounting and adjustment

As in an ordinary clockwork, the oscillations of the pallet 105 incident to the step-by-step advance of the escapement wheel are thus transmitted to the balance wheel when the latter is free so that this wheel oscillates back and forth at a frequency which is determined by the torsional resistance offered by a suitable hairspring. In the present instance, the latter takes the form of an elongated and thin flat strip 118 of spring steel secured at one end by a suitable coupling 119 to the upper end of the balance wheel shaft 109.

The longitudinal axis of the strip coincides with the projectile axis 16 and the strip extends upwardly to a clamp 120 which is specially constructed for adjustment along the strip to provide for uniform gripping of the strip in all of its positions of adjustment. To this end, the strip is enclosed in a hollow post 122 (Figs. 3 and 8) rigid at its lower end with the upper plate 78 and threaded at its upper end into one end of a collar 123 whose other end is threaded onto the tube 124 having a longitudinal slot 125 receiving a key on the end of a screw 126 on the post 122. The threads of the collar are of opposite pitch so that when the clamp 120 and the screws 126 are released, the clamp may be slid up or down along the strip 118 so as to vary the effective length of the latter and therefore the frequency of oscillation of the balance wheel.

Herein the clamp 120 (see Fig. 9) comprises two U-shaped clips 127 straddling the wall of the tube 124 at the upper end and on opposite sides thereof with their outer legs operative to receive screws 128 threading radially through the tube walls. The inner coned ends of the screws seat in depressions 129 formed in the inner legs of the clips to provide for contact with opposite sides of the strip only in a single plane. As a result, the clamp may be applied and released and adjusted along the strip without subjecting the latter to edgewise twisting or other stresses affecting its timing action.

Safety control of timer

To maintain the clockwork inactive during transportation of the projectile and then to initiate its operation only in response to actual firing in a rifle, provision is made for normally holding the balance wheel 110 against turning and for releasing the same only at the proper time in the projectile flight so as to insure absolute safety in the handling of the projectile. For this purpose, the outer peripheral edge of the balance wheel is notched at 130 (Figs. 10 and 12) to receive pins 131 which are mounted for radial movement into and out of the notches and are normally urged into the latter as shown in Fig. 10 so that the radially disposed sides of the notches are urged against the pins under the torque of the hair spring 118.

The pins (see Figs. 8, 10, and 24) are disposed on diametrically opposite sides of the axis 16 and are carried by the outer ends of levers 133 of arcuate shape fulcrumed intermediate their ends on pins 134 upstanding from the plate 76 and disposed parallel to the axis 16 and on opposite sides of the latter along a diameter which is perpendicular to a plane including both of the pins 131. Formed on the outer ends of the levers beyond the pins 131 are weights 132 which are urged inwardly to the latching positions shown in Fig. 10 by torsion springs 135 encircling the respective pins 134 with the free end anchored at 135ᵃ in a short arm 133ᵃ of the lever projecting from the fulcrum in a direction opposite the weighted arm 132 of the lever. Each spring urges its associated arm 133ᵃ outwardly to a position which as shown in Fig. 10 is limited by engagement of a shoulder 137 on the arm with the free end 137ᵃ of the weighted arm 132 of the other latch lever. The latter arm curves around the axis 16 to a point nearly opposite the lever fulcrum so that, in the latching position of the weights 132, the ends 137ᵃ abut the shoulders 137 and lie alongside the inner surface 133ᵇ of the arm 133ᵃ which thus blocks the arm end. Thus the end 137ᵃ of one lever 133 blocks the arm 133ᵃ of the other lever against independent inward movement and thus prevents outward movement of the weight 132 of the first lever so long as the second weight is in its innermost position (Fig. 10). If, however, both weights 132 are subjected to centrifugal force as during spinning of the projectile in the initial part of its flight the ends 137ᵃ of both latch levers will move outwardly and by virtue of the curvature of the surfaces 133b, the arms 133ᵃ will be permitted to swing inwardly as the weights and the pins 131 move outwardly. With both of the pins thus withdrawn from the notches, the balance wheel is free to turn, starting of the clockwork thus being initiated. By controlling the balance wheel release by two separate weights disposed on diametrically opposite sides of the axis 16, there is no possibility of the release being effected accidentally during transportation or handling of the projectile. That is to say, neither of the levers 133 is movable independently of the other owing to the blocking by the end 137ᵃ of the lever. Thus, the safety mechanism remains unaffected by unidirectional impacts irrespective of the direction thereof.

Winding of clock spring

By fixing the outer end of the clock spring 66 directly to the projectile casing, the overall construction of the clockwork is greatly simplified, the detrimental effect of centrifugal forces on the moving parts may be minimized, and the problem of compensating for backlash in the gearing is eliminated. These advantages are made possible by a novel construction of the clock which permits the spring to be wound up by reverse turning of the escapement wheel 95 without danger of damaging the pallet 105, and this in spite of the necessarily delicate construction of the latter. For this purpose, the teeth 96 of the escapement are inclined outwardly and in the direction of the spring torque as shown in Fig. 14 so that the backs 102 of the teeth, when a reverse torque is applied to the wheel, act as cams to wedge first one and then the other of the pallet fingers 97 and 98 outwardly. The escapement teeth are thus permitted to pass the fingers as is necessary in order for the wheel to turn counterclockwise and the spring 66 to be wound up.

Preferably the reversely directed winding torque is applied to one of the gears of the clockwork, the gear 91 in this instance. This may be accomplished by providing for access to the gear from the exterior of the clockwork casing as by providing alined apertures 141 (Fig. 10) in the plates 72 to 78 large enough to receive a key or shaft 142 and a pinion 143 on its end. After inserting the key and meshing the pinion with the teeth of the gear 91, the pins 131 blocking the balance wheel are withdrawn from the notches 130 which may be accomplished by projecting suitable tools down through holes 144 (Fig. 6) in the block case and into holes 145 (Fig. 10) in the flyweights 132 and then separating the tools to retract the flyweights and remove the pins 131 from their notches. With the balance wheel released, the key is turned thus applying torque to the elements of the gear train and, through the pinion 90 and the gear 88, turning the shaft 64 in a direction to wind up the spring. This is permitted by the reverse turning of the escapement and oscillation of the pallet and balance wheel as above described. During this winding operation, the possibility of the pallet 105 being oscillated beyond its normal operating range and far enough for the lug 115 to pass out to the notch 116 is prevented by a stop 147 (Figs. 8 and 13) staked into the outer end of the pallet arm 107 and engageable with banking pins 148 rigid with the plate 76.

Assembly procedure

With the parts constructed and arranged as above described, the procedure of assembling and adjusting the units and combining the same in the final fuse assembly shown in Fig. 8 is as follows: The clockwork unit 10 includes the various plates doweled and fastened to the bottom of spring case 70 and having the hairspring mounting upstanding as shown in Fig. 3. The key 142 is projected down into the top of the unit and turned while the balance wheel stop pins 131 are held retracted by a suitable tool inserted through holes in the top of the clockwork case. With the spring thus wound, the stop pins are again retracted and, by observing the oscillations of the pallet 105, the frequency of the unit is determined. The hair spring clamp is adjusted and the operation repeated until the clockwork is properly regulated to produce a desired rate of turning of the timing disk 11. Contrary to the practice necessary with prior fuse timers, such regulation may be effected while the clock casing is stationary instead of being rotated at the speed attained by the projectile when fired from a rifle. This is possible by virtue of the location of the balance and escapement wheels on the projectile axis and the division of the mass of the pallet into parts disposed on opposite sides of the projectile axis. In this way, the centrifugal forces incident to spinning of the projectile in its flight substantially balance out each other and the resultant side thrusts on the moving parts are of such small magnitude as to have no significant affect on the operation of the clockwork in measuring the selected time interval. This result is also facilitated by the centering of certain of the clockwork gears and the spring itself on the projectile axis. The overall construction thus obviates the necessity of spinning the clock case during its testing and adjustment.

Before fitting the regulated clockwork unit into the body 19, the firing pin safety mechanism including the slider 36 and the latch weights 42 are assembled on the top of the boss 22 of the body 19 and the firing pin assembly carried by the cup 26 is fitted into the body with the lug 55 disposed between the ends of the backed off screws 56 as above described and shown in Fig. 20, thus alining the hole 48 with the passage 49 and the line of movement of the slider 36 whose guideway is formed in the disk 39 pinned to the boss 22. In this definite angular position of the cup, the firing latch control lug 60 is disposed opposite a hole 152 (Figs. 7 and 8) in the cup and the hole is radially alined with a hole 153 (Figs. 2, 8, 16 and 17) extending through the body 19, the Welsh plug 154 then being missing from the hole.

A spacer ring 150 (Fig. 8) is placed over and around the cup 26 and seated on an internal shoulder 151 on the body 19 after which the clockwork unit 10 is lowered into place, an external flange 155 thereon (Figs. 3, 6 and 8) seating on the spacer ring. A serpentine annulus 156 of spring material and a compression ring 157 are next fitted over the upper end of the cup member 70 and against the flange 155.

Figure 5:
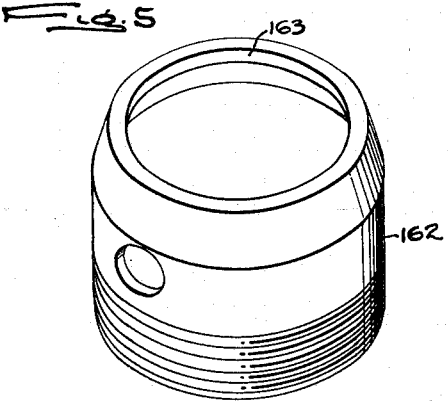
Fig. 5 is a perspective view of the clamping ring.

The clockwork unit is coupled to the fuse setting ring 12 for turning in unison therewith by means of a sleeve 158 (Figs. 3, 6 and 8) having a threaded upper end of reduced diameter and pairs of squared notches 159 and 160 opening axially from opposite ends of the sleeve. The latter is sized to fit down over the upper end of the clockwork unit and seat against the ring 157, squared radially projecting lugs 161 (Figs. 6 and 8) on opposite sides of the plate 71 being received with a close fit in the notches 159 as shown in Figs. 3 and 8. To clamp the sleeve 158 and the clockwork now coupled thereto to the body 19, a collar 162 (Figs. 3, 5 and 8) is fitted down over the sleeve and its lower end is screwed into the internally threaded upper end of the body until an inturned flange 163 at the upper end of the collar comes against the external flange 164 which is formed intermediate the ends of the sleeve 158 (Fig. 8). The collar is tightened down still further to compress the spring 156 and create the desired friction between the clock case and the body 19 for holding the clockwork against turning after the fuse has been set preparatory to firing.

The parts as thus far assembled are shown in Fig. 3. Next, the setting ring 12 (Figs. 4 and 8) is journaled on the body 19 through the intermediary of the coupling collar 162. For this purpose, the ring is fitted down over the upper end of the collar 158, the inwardly projecting lugs 175 near the top of the cap entering the notches 160 in which the lugs fit closely so as to establish an accurate angular relation between the setting ring 12 and the fuse body 19. When the ring abuts against a gasket 168 seated in a groove in the upper end of the base, a reference mark 171 on the adjusting ring 12 (Figs. 1 and 4), will be disposed adjacent and in precise alinement with the zero mark 172 on a scale 173 encircling the upper edge of the conical surface 167 on the body 19. The scale is calibrated in units of time measured during operation of the clockwork.

Finally, the assembly shown in Fig. 2 is covered by screwing the upper cap 18 onto the upwardly projecting end of the sleeve 158 until the lower end of the cap comes against and compresses a gasket 169 in the upper end of the ring. The gaskets provide water tight seals between the three parts of the fuse casing which permit the intermediate part or ring 12 to be turned to set the fuse timer.

It is an important feature of the construction above described that the setting of the firing pin release mechanism accurately with reference to the timing disk 11 may be effected from the exterior of the fuse casing and after complete assembly of the fuse. This is known as the zero setting and involves angular adjustment of the supporting cup 26 and the firing pin release latch 13 and its control lever 32 to bring the lug 60 on the lever into precise radial alinement with the notch 61 in the timing disk on the clock case. For this purpose, the interior of the body 19 is illuminated by projecting light through a hole 165 (Fig. 8) in the boss 22, the Welsh plug 166 not having been inserted in the hole. Through the then open peep holes 153 and 152, the now illuminated lug 60 and the notch 61 are plainly visible and appear as shown in Fig. 3. Since the heads of the screws 56 are now exposed below the base of the coned surface 167 of the base, they may be adjusted as described above to shift the cup 26 and therefore the latch control lever 32 and the lug 60 thereon angularly back and forth until the lug is radially alined precisely with the notch as shown in Figs. 16 and 26. At this time, the lug 60 is blocked by the guard 82 rigid with the clock case 70 and is thus prevented from entering the notch. After completing the zero setting, the plugs 154 and 166 are pressed into the holes 153 and 165 thus completing the water tight closure of the operating parts.

*Operation after projectile firing*

The fuse unit thus completed, its clockwork regulated, and the firing pin control set for zero may be attached to a projectile casing by screwing the base into the casing as shown in Fig. 1. Preparatory to firing the projectile, the fuse is set for the desired time of flight before explosion of the projectile. This is effected by turning the setting ring 12 relative to the base 19 to move the reference mark 171 away from zero on the scale 173 and until this mark appears opposite the graduation of the scale corresponding to the selected time of flight. In this adjustment, the nose cap 18 and the entire clock case, which is coupled to the ring 12 by the sleeve 158, turn with the ring and thus carry the notch 61 in the timing disk 11 and the guard 82 around the projectile axis and away from the lug 60 to the set position shown in Fig. 17. The angular spacing of the lug and the notch correspond to the selected time of flight.

Now when the projectile is fired from a rifle and the centrifugally acting safety mechanism 131, 132 releases the balance wheel, the operation of the clockwork is initiated to turn the disk 11 relative to the clock case and back toward the lug 60, the guard 82 remaining in fixed position relative to the case to which it is attached. Finally, when the selected interval has expired, the notch will reach a position of precise radial alinement with the lug 60 and the detent 32 will under the centrifugal and spring forces acting thereon swing outwardly to the position shown in Fig. 20, thus releasing the latch 13. The latter swings outwardly under the centrifugal force acting thereon and the firing pin is released to the action of its spring. Since the slider 36 of the safety mechanism is at this time latched in the position shown in Fig. 22, the pin moves through the hole 47 and against the cap 15 thus exploding the main charge of the projectile.

*Summary*

It will be seen from the foregoing that the various operating parts of the fuse and their mountings are capable of being made with great precision either as sheet metal stampings or by high speed yet accurate production on automatic machines such as screw machines. The operating units form simple subassemblies which may be produced separately and then combined with equal precision in the final assembly by interlocking of the housing parts and the subassemblies. The centering of most of the moving parts on the projectile axis minimizes the effect of friction in service use and reduces the regulation of the clockwork to a simple procedure. That is to say, after static regulation in the manner above described the clockwork will measure precisely the same time interval when fired from a rifle thus avoiding the complications normally involved in regulating the clockwork diametrically. By centering of the firing pin and its latch, side thrusts and friction are virtually eliminated in this part of the fuse further contributing to the precise measurement of the projectile flight interval. Finally, the zero setting of the firing pin release is effected after complete assembly of the units thereby minimizing many of the errors which have contributed to inaccurate timing in prior projectile fuses. All of these factors combine to make the improved fuse a precision mechanism comparable to a watch and yet permit of low cost manufacture and assembly by unskilled labor.

The construction of the clockwork and firing pin release mechanism is readily adaptable to different time ranges as required for different military uses. To this end, space is provided within the clock case for the substitution of gear units having different gear ratios corresponding to the time range desired. The unit to be substituted in the present instance comprises the pinion 92 and the gear 93. No other change is required, the escapement mechanism and its manner of regulation remaining the same.

We claim as our invention:

1. In a projectile fuse, the combination of, a hollow body threaded internally at one end and having an internal shoulder spaced from and facing toward said end, an adjusting ring abutting at one end against said body end, a clockwork having a case disposed within said ring and supported by said shoulder, a sleeve surrounding said case and coupled thereto, said sleeve having an external flange and a threaded end projecting axially beyond said ring, a collar within said ring threaded into said body and engaging said flange to urge said case toward said shoulder, means coupling said ring to said sleeve for turning of the ring, the sleeve, and the case in unison, yieldable means interposed between said sleeve and said case to create a frictional torque resisting turning of said ring, and a nose cap threaded onto said sleeve and abutting the other end of said ring.

2. In a projectile fuse, the combination of, a hollow body having an internal shoulder spaced from and facing toward one end of the body, an adjusting ring abutting at one end against said body end, a clockwork having a case disposed within said ring and supported by said shoulder, a sleeve surrounding said case and coupled thereto, said sleeve having a threaded end projecting axially beyond said ring, means on said body urging said case toward said shoulder, means coupling said ring to said sleeve for turning of the ring, the sleeve, and the case in unison, and a cap threaded onto said sleeve and abutting the other end of said ring.

3. In a fuse, the combination of, a hollow body, a self-contained firing pin unit coaxial with and telescoped in said body and having a firing pin release member paralleling the axis of said body and movable inwardly to release the firing pin, means accessible from the exterior of said body to adjust said unit angularly about said axis, a ring journaled on said body for adjustment about said axis, a self-contained spring driven clockwork unit telescoped in and coupled to said ring and having a driven disk engageable with said member and rotatable relative to the clockwork case, said disk having a notch for receiving said member in a predetermined position of the disk, and means on said case and movable therewith to block the inward movement of said member when the latter is alined radially with said notch and said case is in a zero position.

4. In a fuse, the combination of, a hollow body, a self-contained firing pin unit coaxial with and telescoped in said body and having a firing pin release member movable radially to release the firing pin, means accessible from the exterior of said body to adjust said unit angularly about said axis, a ring journaled on said body for adjustment about said axis, a self-contained clockwork unit telescoped in and coupled to said ring for angular adjustment therewith and having a driven element engageable with said member, said element, when in register with said member, permitting movement thereof to released position, and means on the case of said clockwork and movable therewith to block the releasing movement of said member when said ring is in a zero position.

5. In a fuse mechanism, the combination of, a hollow body, a firing pin mounted in said body to slide longitudinally of the axis thereof, a clockwork mounted in said body to turn about said axis and having a case and a driven element rotatable relative thereto and having a radially opening peripheral notch, latch means holding said firing pin in retracted position including a member movable into said notch when the latter is, by turning of said element, brought unguarded into radial alinement with the member, a support carrying said latch and mounted on said body for adjustment about said axis, a guard on said case normally blocking entry of said member into said notch when the case is disposed in a predetermined zero position, and means accessible from the exterior of said body and operable to adjust said support angularly, said body having an opening through which said member and said notch may be observed during adjustment of said case.

6. In a fuse, the combination of, a hollow body having an opening in the wall thereof and two holes extending circumferentially through the wall and converging inwardly, screws threaded inwardly through said holes, a clockwork having a case journaled in said body, a support mounted for angular adjustment on said body and having a part disposed between the inner ends of said screws, said clockwork having a driven disk with a peripheral notch therein, a spring loaded firing pin slidable in said body, and means for latching said pin in set position including a member on said support observable through said wall opening and coacting with said notch.

7. In a fuse mechanism, the combination of, a hollow body having a hole opening radially therefrom, a firing pin mounted in said body to slide longitudinally of the axis thereof, a clockwork mounted on said body and having a rotary driven element whose periphery is visible through said hole, said element having a radially opening notch, latch means for said pin including an arm disposed opposite said hole and movable into said notch when the latter is, by turning of said element, brought unguarded into radial alinement with said arm, a support carrying said latch means and mounted on said body for independent adjustment about the axis thereof, and selectively operable means for angularly adjusting said support and clockwork relative to each other to bring said arm into a predetermined zero position with respect to said notch.

8. In a fuse mechanism, the combination of, a hollow body, a firing pin mounted in said body to slide longitudinally of the axis thereof, a clockwork mounted in said body to turn about said axis and having a case and a driven element rotatable relative thereto, a latch for holding said firing pin in set position, a member coacting with said driven element in a predetermined angular position of the latter to release said latch, means movable with said case and operable in a zero position of the latter to block said member, a support for said latch mounted on said body for independent adjustment relative to said body, and means for angularly adjusting said support and said driven element relative to each other, said body having a hole therethrough exposing said member and element to view.

9. In a projectile fuse, the combination of, a hollow body having an adjusting ring rotatable about the axis of the body, a spring loaded firing pin mounted in said body, a latch normally holding said pin in set position and including an element movable to release the pin, a self-contained clockwork unit including a case journaled in said body and coupled to said ring for adjustment about said axis away from a zero position, said clockwork having a driven element rotatable about said axis during operation of the clockwork and coacting with said latch element in a predetermined zero position to release said latch, means supporting said latch for adjustment about the axis of said body to establish a zero setting of said clockwork, and means rotatable with said clock case and operable in the zero position thereof to block said latch element against releasing movement, said last mentioned means being disabled by turning of said clockwork unit away from said zero position.

10. In a projectile fuse, the combination of, a body rotatable about a central axis during the flight of the projectile, clockwork mounted on said body and including a balance wheel mounted to oscillate about said axis under the control of a pallet and a torsion spring, latch levers fulcrumed intermediate their ends on said body to swing about axes paralleling and disposed on opposite sides of said axis, weights on corresponding ends of said levers movable outwardly in response to spinning of the body about the axis, latches on said levers interengageable with said balance wheel to hold the latter against turning when either or both of said weights is in said latching position, and an arm on the other end of each of said levers interengageable with the weighted end of the other lever and blocked by the latter against independent latch releasing movement whereby to permit release of said balance wheel only by simultaneous outward movements of both of said weights.

11. In a projectile fuse, the combination of, a body rotatable about a central axis during the flight of the projectile, clockwork mounted on said body and including a part movable angularly and transversely of said axis during operation of the clockwork, two latches movable between blocking and unblocking positions and each interengageable with said part to hold the latter against movement when in blocking position, two weights carried by the respective latches and disposed on opposite sides of said axis so as to move outwardly therefrom in response to spinning of the projectile about said axis and move said latches to unblocking positions, and means on each of said latches interengageable with the other latch to block outward movement of the weight of the latter latch independently of the first latch while permitting outward movement of both weights simultaneously in response to spinning of the projectile about said axis.

12. In a projectile fuse, the combination of, a hollow body adapted to be centered on the projectile axis, and a spring driven clockwork having movable elements mounted on said body and including escapement and balance wheels spaced along and rotatable about said axis, and a pallet swingable about an axis paralleling said axis and having two arms spaced along said axis and respectively coacting with the teeth of said escapement and with said balance wheel on opposite sides of the axis.

13. In a projectile fuse, the combination of, a hollow body adapted to be centered on the projectile axis, and a spring driven clockwork having movable elements mounted on said body and including escapement and balance wheels spaced along and rotatable about said axis, and a pallet pivoted on one side of the axis and coacting with teeth of said escapement wheel on the one side of the axis and with said balance wheel on the opposite side of the axis.

14. In a fuse clockwork, the combination of, a case, a spirally wound clock spring having one end anchored to said case, a clockwork mounted on said case and including a torsion spring, a balance wheel, a pallet, a toothed escapement, and gearing transmitting connected to the other end of said spring and exerting a continuous torque on said escapement, the teeth of said escapement having abrupt impulse faces coacting with the fingers of said pallet to oscillate the latter under said torque, the other faces of said escapement teeth being of lesser slope and acting on said fingers to cam the pallet alternately in opposite directions and thereby oscillate said balance wheel when a reverse torque is applied to said escapement, and latches normally holding said balance wheel against turning but movable in response to spinning of said case to release the wheel, said latches being independently retractible to release the balance wheel during the application of a reverse torque to said escapement to wind up said spring.

15. In a fuse clockwork, the combination of, a case, a spirally wound clock spring having one end anchored to said case, a clockwork mounted on said case and including a torsion spring, a balance wheel, a pallet, a toothed escapement, and gearing transmitting connected to the other end of said spring to exert a continuous torque on said escapement, the teeth of said escapement having abrupt impulse faces coacting with the fingers on said pallet to oscillate the latter under said torque, the other faces of said escapement teeth being of lesser slope and acting on said fingers to cam the pallet alternately in opposite directions when a reverse torque is applied to said escapement, and means for turning a gear of said train to apply said reverse torque to said escapement, and, by turning of the latter, wind up said clock spring.

16. In a fuse mechanism, the combination of, a hollow casing, a firing pin within the casing, a clockwork mounted within said casing for adjustment relative to the casing to determine the firing interval, said clockwork having a rotary driven element, latch means controlling the release of said pin including a member movable to releasing position when said element is in a predetermined angular position, said element and said member being visible through an opening in said casing, and means operable from the exterior of said casing and independently of said clockwork to adjust the angular relation of said element and member.

References Cited in the file of this patent

UNITED STATES PATENTS

| 1,640,165 | Varaud | Aug. 23, 1927 |
| 1,665,899 | Varaud | Apr. 10, 1928 |
| 2,094,032 | Zornig | Sept. 28, 1937 |
| 2,138,234 | Henry | Nov. 29, 1938 |
| 2,149,470 | Schenk | Mar. 7, 1939 |
| 2,164,115 | Lasserre | June 27, 1939 |
| 2,325,749 | Delay | Aug. 3, 1943 |
| 2,446,745 | Delay | Aug. 10, 1948 |
| 2,531,121 | Fink | Nov. 21, 1950 |
| 2,664,046 | Hoenger | Dec. 29, 1953 |

FOREIGN PATENTS

| 453,567 | Great Britain | Sept. 14, 1936 |
| 587,551 | Great Britain | Apr. 29, 1947 |